United States Patent [19]

Moreland et al.

[11] Patent Number: 5,419,076
[45] Date of Patent: * May 30, 1995

[54] LIVESTOCK WALK-THROUGH FLYTRAP

[75] Inventors: Thomas W. Moreland, Ellicott City; Lawrence G. Pickens, Laurel; Richard W. Miller, Bowie, all of Md.

[73] Assignees: The United States of America as represented by the Secretary of the Agriculture, Washington, D.C.; University of Maryland, College Park, Md.

[*] Notice: The portion of the term of this patent subsequent to Sep. 20, 2011 has been disclaimed.

[21] Appl. No.: 302,268

[22] Filed: Sep. 8, 1994

Related U.S. Application Data

[63] Continuation of Ser. No. 106,618, Aug. 16, 1993, Pat. No. 5,347,748.

[51] Int. Cl.6 .............................................. A01M 1/22
[52] U.S. Cl. ...................................................... 43/107
[58] Field of Search .......................... 43/107, 112, 98; 119/156, 157, 159

[56] References Cited

U.S. PATENT DOCUMENTS 2,141,454 12/1938 Sudlow .................................... 43/112
5,257,474 11/1993 Burgos .................................... 43/107

Primary Examiner—P. Austin Bradley
Assistant Examiner—Jeanne M. Elpel
Attorney, Agent, or Firm—Oblon, Spivak, McClelland, Maier, & Neustadt

[57] ABSTRACT

A walk-through fly trap for cattle and similar livestock is provided with a steel tubular frame on which is provided a roof and sides of pressure treated lumber. The sides support panels bearing electric grates, which grates are accessible to flying insects on both the inside and outside of the trap. Insects are attracted to the grates by lights mounted proximal to the grates on the panel, the warmth associated therewith, and attractive colors of the panel. The grates may be electrified with sufficient voltage to explode flying insects on contact, so as to prevent accumulation of insects thereon.

9 Claims, 3 Drawing Sheets

LIVESTOCK WALK-THROUGH FLYTRAP

This is a continuation of application Ser. No. 08/106,618, filed on Aug. 16, 1993, now allowed as U.S. Pat. No. 5,347,748.

FIELD OF THE INVENTION

This invention pertains to a walk-through fly trap. Specifically, a chemical-free means for controlling fly pest populations in cattle herds and the like is disclosed, which may be sized for a variety of animals, is durable, and accessible to insects both inside the trap and outside the trap.

BACKGROUND OF THE PRIOR ART

Commercial losses due to cattle and livestock pests, including the face, stable and horn flies, as well as other airborne pests, are well documented. Hall et al, *J. Econ. Entomol.*, 82, pages 530–534 (1989) put the loss to the horn fly alone at an estimated $730.3 million dollars per year in the United States. The Hall reference documents a trap designed to permit the walk-through of cattle and other livestock, removing the flies from the livestock and trapping the flies in screen trapping elements. The trapping elements are accessible only from the interior of the walk-through trap. Similar traps were described as far back as 1938, Bruce, *J. Kans. Ent. Soc.*, July, 1938. The Bruce design is discussed in the Hall article. Increases in the problems encountered in fly populations can be attributed, in part, to the use of straw and practice of feeding cattle hay from large rolled bails. The straw and rolled bails provide an ideal breeding medium for the stable fly. Thus, flies and similar airborne pests present an increasing and commercially significant problem for cattle and livestock farmers in the United States, as well as the rest of the world.

One typical response to this increased problem has been the use of increased insecticides. The use of insecticides has been widely documented as harmful to the environment, expensive, and ultimately ineffective, as resistance to each new insecticide is developed. An alternative method to control the pest problem is to design a fly trap which will effectively collect and destroy large portions of the fly population for any given herd or farm. Thus, U.S. Pat. No. 580,163, Richter, U.S. Pat. No. 642,399, White et al, U.S. Pat. No. 645,880, Varnum, U.S. Pat. No. 701,873, Gibson, U.S. Pat. No. 870,360, Harbuck are all older patents describing a wide variety of fly trapping means which permit a cow or other livestock to walk through a structure, the flies being removed from the cow while passing through the structure. Most of the early references use removable trap boxes to collect the flies, such as those set forth in U.S. Pat. No. 645,880, Varnum. U.S. Pat. No. 1,258,763, Girvin et al and U.S. Pat. No. 4,179,840, Sandefur, combine temporary structures with insecticidal means for addressing the fly pest problem. Other patents addressing a variety of walk-through fly trapping means include U.S. Pat. No. 1,260,339, Crockenberger, U.S. Pat. No. 1,312,130, Merrill et al, U.S. Pat. No. 2,141,545, which describes an illuminated trap as does U.S. Pat. No. 3,894,351, Iannini, which uses electric means for killing the collected insects. Another electric fly killing device is described in U.S. Pat. No. 4,300,306, Audgin, which is addressed to an electric screen which may be mounted in a field, but does not involve a walk-through trap. U.S. Pat. No. 5,205,063, Sutherist et al, describes a walk-through insect trap with transparent or translucent sides.

A hallmark of all the walk-through traps and related devices described in the prior art is that the trap or killing device is accessible only to insects on the interior of the trap, that is, insects brought into the trap or structure by the cattle. As many of the insects will not enter the trap with the cattle, kill rates are not sufficiently effective to reduce the commercial losses experienced.

Accordingly, it remains a pressing need in the art to provide a walk-through fly trap with fly killing means sufficient to increase the fly kill rate, and thereby provide a non-chemical dependent method of controlling the fly pest populations in livestock in the U.S. and around the world.

SUMMARY OF THE INVENTION

Applicants' invention lies in a sturdy, inexpensive structure through which cattle or other livestock can be directed, provided with means for removing flies from the cattle walking through the structure, and further provided with electric grids mounted in the sides of the structure, such that the grids are accessible to insects from both the interior and the exterior of the trap. Plastic strips or the like are hung inside to remove the flies from the cattle as they walk through, and the grids are illuminated so as to attract insects. The trap is generally painted a color which attracts flying insects of the type which will not generally enter the trap with the animal.

The structure is based on a sturdy frame preferably prepared from durable steel tube, to endure the heavy usage and impact by cattle and the like. It may be sized to meet the requirements of the livestock with which it will be used. Pressure treated or water-resistant plywood is bolted to the frame to construct the enclosure, with grids inserted in the sidewalls, so as to be accessible to flies within the trap, and flying insects outside the trap. The invention may be solar powered, e.g., the roof may support a solar collector, so that the traps can be readily used in remote areas.

BRIEF DESCRIPTION OF THE DRAWINGS

FIGS. 3 and 4 illustrate the bottom and top frame sections, respectively, while

DETAILED DESCRIPTION OF THE INVENTION

Figure 1:
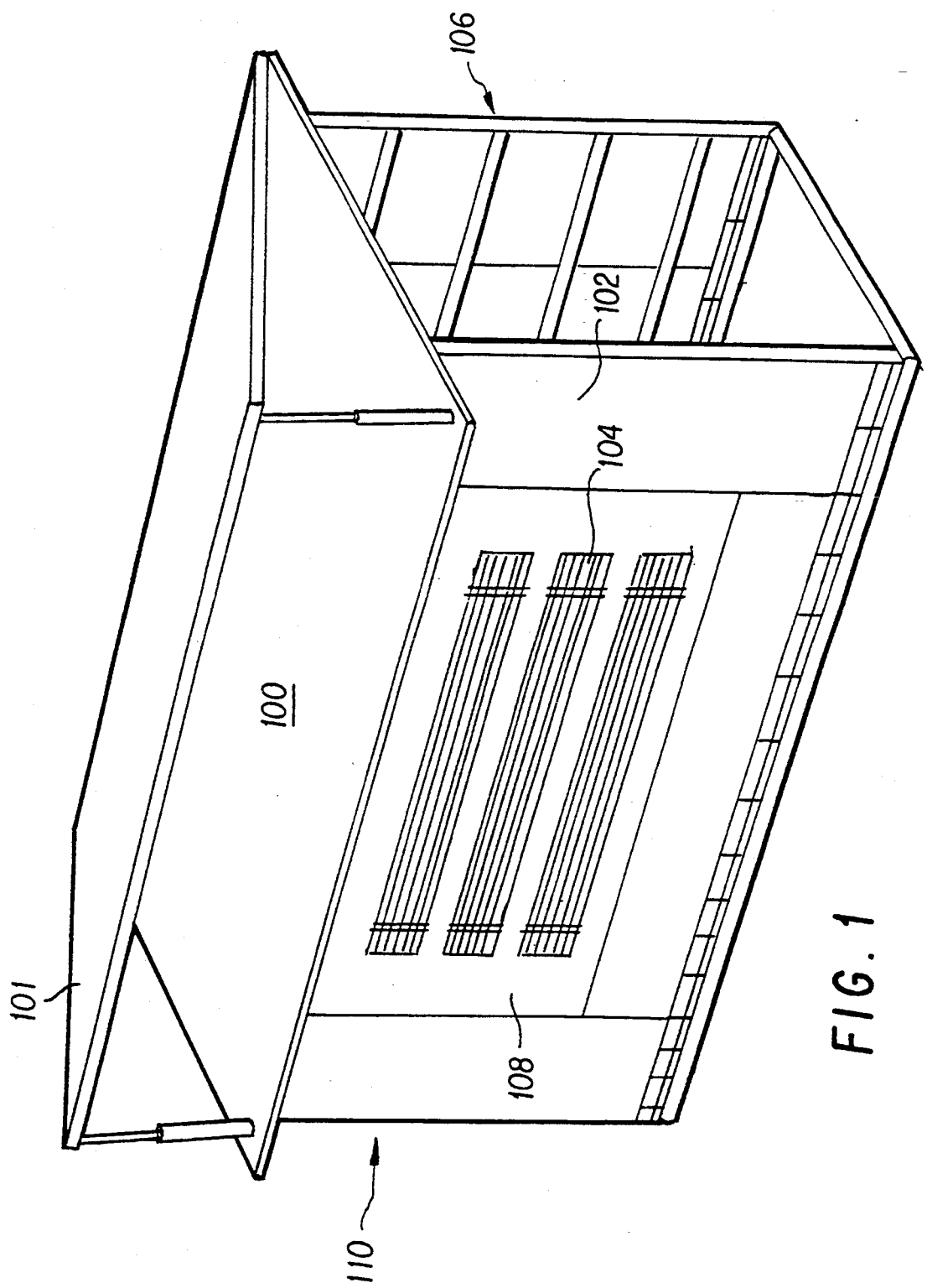
FIG. 1 is an isometric view of the completed walk-through structure.

As illustrated in FIG. 1, the fly trap structure of the invention is a roughly rectangular cube, which may be sized to appropriate dimensions to accommodate the livestock intended to pass through the trap. A plywood roof 100 is provided in areas where the electric grids of the trap and illumination will be powered by extrinsic power sources, but roof 100 may support a solar panel 101, so as to provide solar power for use in remote areas. Roof 100 is supported on sidewalls 102, which again are preferably prepared from an element-resistant material, such as pressure treated lumber or plywood. Each side 102 has mounted on it electric grids 104 in a panel 105 which provide accessibility to the grids from either the exterior of the trap or the interior of the trap. In the illustration, three electric grids 104 are mounted on each side of the trap, but the size and number of grids will vary depending on the size of the structure and livestock to be driven through. The plywood is mounted on a rigid steel frame generally indicated at 106. This steel tubular frame is easily assembled, yet durable to resist the heavy wear imposed by cattle and similar livestock. The steel frame may be more easily viewed in FIG. 2, a top elevation with the roof removed. Steel frame 106 describes the rectangular outline of the structure 110, and is braced at the top with two steel "C" channels 108. Also suspended from the top of the steel frame 106 are cross pieces 120 from which are hung means for removing flies from the cattle passing through. As is generally well known in the art, this means may comprise plastic hanging strips 118 or other material through which the cattle may pass, but rub against the skin of the cattle, removing the flies. Cloth strips, brushes and the like may be substituted for plastic, as is known in the art.

Figure 3:
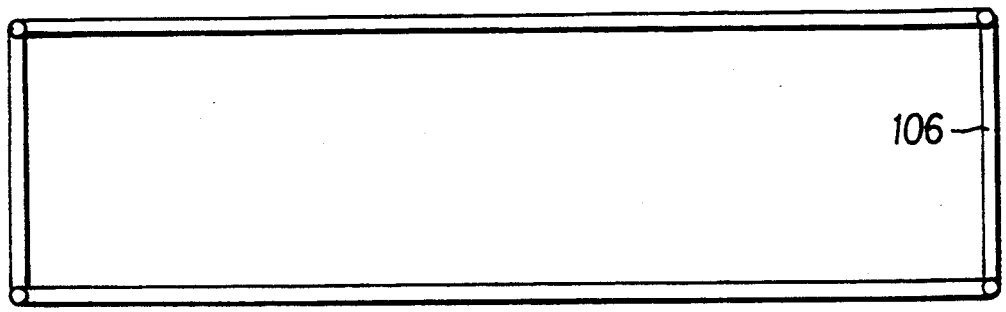
Figure 4:
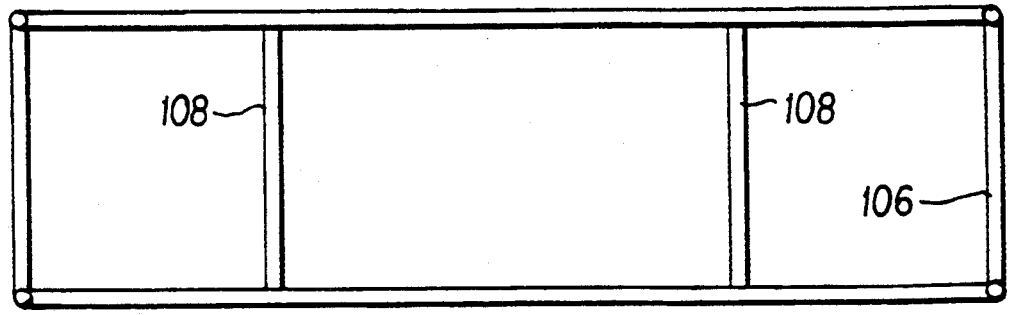
Figure 5:
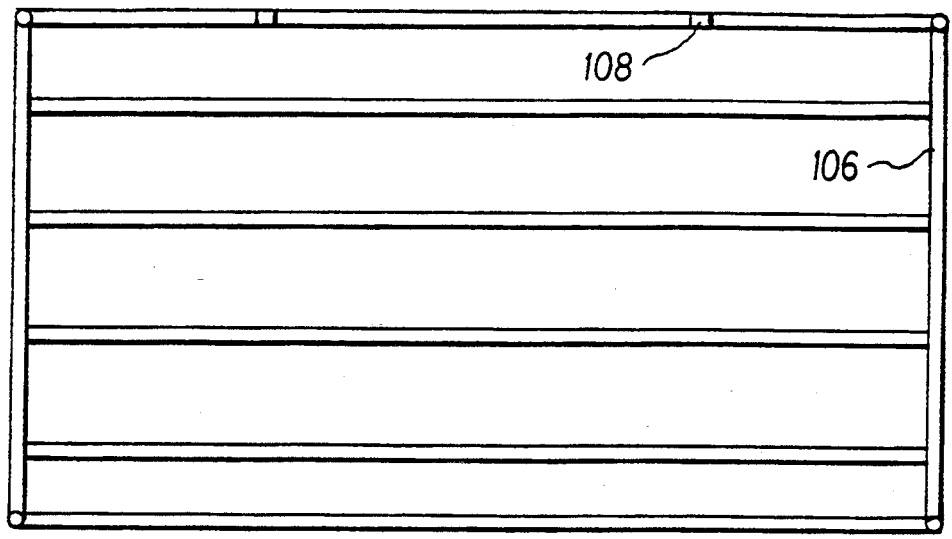
FIG. 5 is an illustration of the side frame structures.

Bottom and top frame structures are illustrated in FIGS. 3 and 4 respectively, and clearly outline the rectangular shape of the structure. Although the length of the structure must be designed to accommodate the animal in question, a representative length for use with cattle in the United States would be on the order of 11 feet. The opening, or width of the trap must be similarly designed to be big enough to accommodate the largest specimen to be used in connection therewith, and is generally on the order of 3–4 feet. The frame is considerably taller than the animals to be walked through, to provide for the apparatus of the trap, the frame side structures being illustrated in FIG. 5. Structures of 6–6½ feet in height are suitable for use with cattle in the United States.

Figure 6:
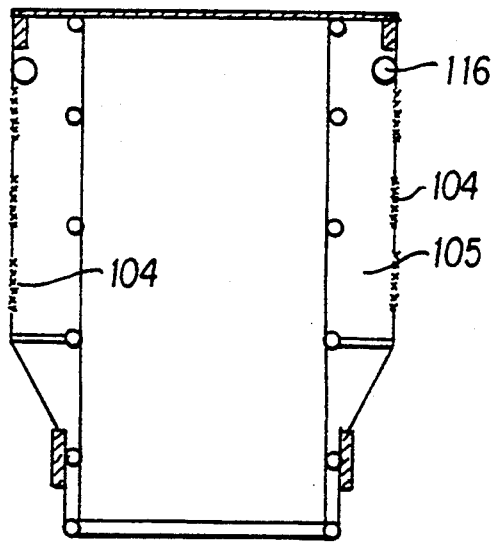
FIG. 6, an alternative view, illustrates the insertion of the electrified insect grids in the sidewalls, in a cross-section taken transversely through the fly trap structure.

As illustrated in FIG. 6, a cross-section taken transversely through the structure, in sides 102 of the trap electrified insect grates 104 are mounted on the panels employed, which grids may carry a current sufficient to explode the insects on contact, or a reduced current, sufficient for electrocution. An important aspect of the invention is that electric grates 104 are situated as to be accessible both to the insects within the trap, brushed off the bodies of the cattle moving through, and insects outside the trap which do not ordinarily go through with the cattle. To this end, the grate mounting panel 105 may be supported on a brace 114 welded to the side frame. Further, to attract the insect to the electrified grating, illumination is provided on both sides of the trap, such as attractant lights 116. Sufficient lights are spaced along the length of the track to ensure that insects are attracted to the grates along their entire effective length. Of course, in the alternative, the illumination means can be an extended bulb running along the length of the electrified grate. In traps of truly large dimension, it may be necessary to provide illumination at more than one point along the height of the trap.

The tubular frame members can be conveniently welded together, and the wood sides and roof fastened to the frame with carriage bolts. Panels 105 are mounted to the wood sides 102 with retaining means such as galvanized screws and the like. The panels may be preferably prepared from VIZCOCLEAN brand plastic panels with the grates mounted thereon, or prepared from another similar material painted or colored white or other insect-attractant color.

Figure 2:
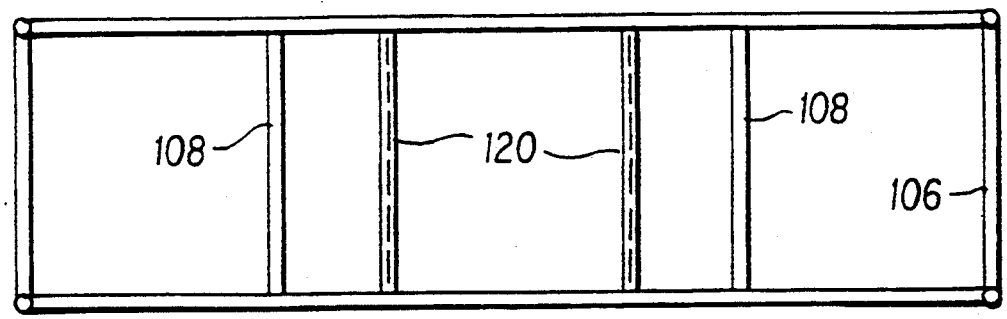
FIG. 2 is a top elevation of the structure, with the plywood top removed, the remaining portions visible intact.
Figure 7:
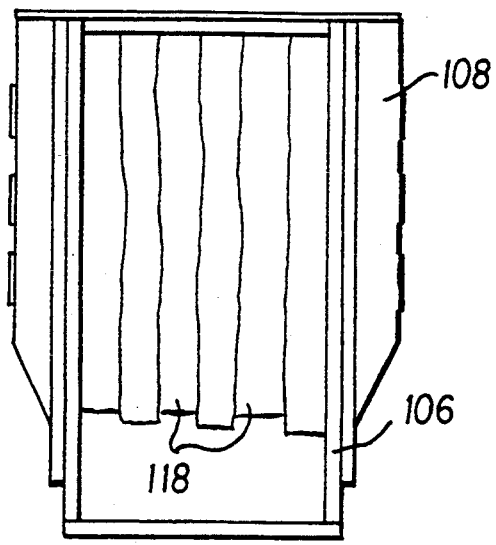
FIG. 7, an alternative view, is an end elevation of the structure, illustrating the means for removing flies from animals walking through the structure.

As illustrated in end elevation, FIG. 7, the trap is provided with hanging plastic strips 118, or similar means for removing the insects from the cattle as they pass through the trap. As illustrated in FIG. 2, a plurality of insect removing means are mounted from the top frame along the length of the trap, so as to ensure that substantially all the insects are removed from the cattle passing through.

The trap has been subjected to field testing under controlled conditions, such that cattle are entice or led to pass through the fly trap at least twice a day. In these tests, up to 95% of the biting horn flies in a pasture are removed by use of the trap. This is a dramatic increase over the 50% removal documented by Hall et al, *J. Econ. Entomol.*, 82, pages 530–534 (1989).

The increase observed in the efficiency of the trap disclosed herein is believed to lie in the availability of the killing grates to flies both associated with a particular beast traveling through the trap, such as a horn fly, and flies that reside in the pasture, in association with cattle, but do not necessarily enter the trap in association with a particular animal, such as stable flies. These flies are attracted by the color, illumination and associated warmth of the trap, and so, particularly at night, a large percentage of insects are removed from the pasture by killing on the exterior of the trap. As noted, at high kill rates, it may be necessary to set the grid voltage at a level which causes the flies to explode, to avoid accumulation. Such levels remain generally safe.

The sensitive grids can be removed from the trap, which is otherwise durable and resistant to both environment and cattle, for storage during the winter in a more protected environment.

Applicants have disclosed the invention in terms of specifics of structure, color and design, without limitation being intended with respect thereto. The invention remains generically disclosed, and additional variations will occur to those of skill in the art without the exercise of inventive faculty, particularly with regard to variables of size, color, power intensity and the like. Such variations remain within the scope of the invention, save as excluded by the limitations of the claims set forth below.

What is claimed is:

1. A walk-through fly trap comprising:
   (A) a cubic rectangular steel frame of dimensions sufficient to allow the passage of livestock therethrough,
   (B) a roof and sides affixed to said frame,
   (C) means affixed to said frame for removal of flying insects from the body of said livestock passing through said trap,
   (D) a plurality of electric grates mounted in panels supported on said sides such that said grates are accessible to flying insects on both the exterior and interior of said trap, said grates being electrified with sufficient voltage so as to kill flying insects making contact therewith.

2. The fly trap of claim 1, wherein said roof supports a solar panel sufficient to power said grates and lights.

3. The fly trap of claim 1, wherein said panels are a color attractive to flying insects associated with the location in which said fly trap is to be used.

4. The fly trap of claim 3, wherein said panels are white.

5. The fly trap of claim 1, wherein said grates are electrified with sufficient voltage so as to explode flying insects making contact therewith to preclude accumulation of flying insects thereon.

6. The fly trap of claim 1, wherein said roof and sides are comprised of pressure treated lumber.

7. The fly trap of claim 1, wherein said fly trap comprises a plurality of said means for removal of flying insects from the body of said livestock.

8. The fly trap of claim 1, wherein said panels are removable from said fly trap for storage during conditions of low insect activity.

9. A walk-through fly trap comprising:

(A) a cubic rectangular steel frame of dimensions sufficient to allow the passage of livestock therethrough, (B) a roof and sides affixed to said frame, (C) strips of flexible material affixed to said frame which said strips contact the skin of livestock passing through said trap, so as to remove flying insects from the body of said livestock passing through said trap, (D) a plurality of electric grates mounted in panels supported on said sides such that said grates are accessible to flying insects on both the exterior and interior of said trap, said grates being electrified with sufficient voltage so as to kill flying insects making contact therewith.

* * * * *